United States Patent [19]

Kaminski

[11] Patent Number: 4,947,792
[45] Date of Patent: Aug. 14, 1990

[54] DECORATIVE SURFACE COATING

[76] Inventor: Kevin F. Kaminski, 325 Union St., Linwood, Mass. 01525

[21] Appl. No.: 337,563

[22] Filed: Apr. 13, 1989

[51] Int. Cl.⁵ .............................................. A01K 63/04
[52] U.S. Cl. ........................................ 119/5; 428/15; 428/327; 428/500
[58] Field of Search ...................... 119/5; 428/15, 327, 428/500

[56] References Cited

U.S. PATENT DOCUMENTS

| 3,682,753 | 8/1972 | Willinger | 428/20 X |
| 4,006,710 | 2/1977 | Van Berkum | 119/5 |
| 4,076,619 | 2/1978 | Howery | 119/5 X |
| 4,370,234 | 1/1983 | Marsland | 210/617 |

Primary Examiner—Henry F. Epstein
Attorney, Agent, or Firm—Shlesinger & Myers

[57] ABSTRACT

A decorative surface coating is disclosed that utilizes a mass of colored plastic particles to cover at least a portion of the bottom surface of a fish aquarium or the like, the particles having the property of being luminescent.

4 Claims, 1 Drawing Sheet

DECORATIVE SURFACE COATING

This invention relates to a decorative coating material and more particularly to a particulate plastic material for covering the bottom surface of or in otherwise decorating the bottom surface of an aquarium to provide an improved visual appearance.

BACKGROUND

Hobbyists and others maintain aquariums for displaying fish and related aquatic life. Frequently a sandy bottom layer is provided for covering the floor of the receptacle. As a replacement for the sand layer it has been proposed in the past grind up waste material from the manufacture of polyester buttons for the purpose of providing a sort of granuled coating material for the bottoms of aquariums. Such material provides an opaque uniform coating layer that closely simulates the appearance of a sandy bottom and provides a useful outlet for an otherwise waste material.

BRIEF DESCRIPTION OF THIS INVENTION

The invention is concerned with the disclosure of an improved form of covering for the bottom of an aquarium that provides a more attractive surface appearance and a more pleasing colorful display. The decorative granules of this invention are colored with various different dyes and are preferably translucent and provided with a shiny surface. The translucent form of the granular material has an opalescent property that produces a pleasing iridescent effect when light is reflected from the particles dispersed over the bottom of the tank. The particles are preferably prepared to be of substantially uniform size and shape, whereby to produce a most attractive surface appearance when spread over the surface at the bottom of an aquarium, or they may be arranged in a decorative pattern over portions of a uniformly coated sand or other bottom to provide an interesting visual background for the display of the fish in the tank.

DETAILED DESCRIPTION

Figure 1:
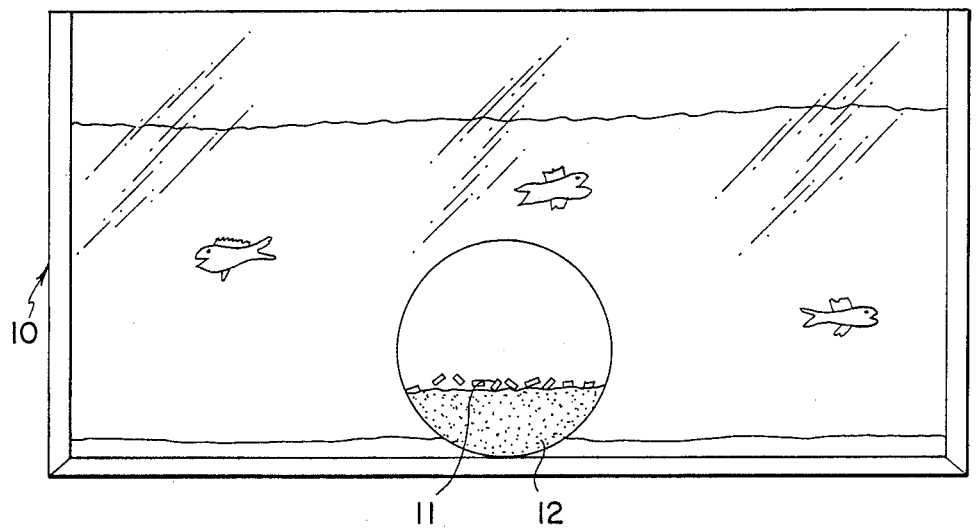
FIG. 1 shows a layer of the decorative particles of this invention in an arrangement for covering a sandy bottom of an aquarium.
Figures 2, 3:
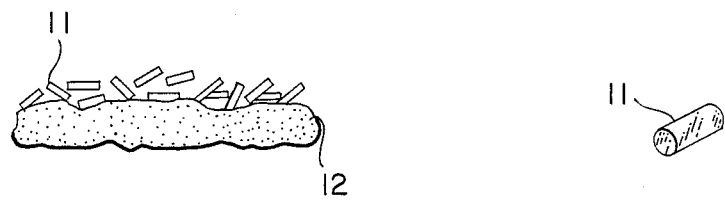
FIG. 2 is an enlarged detail view of the circular area highlighted in FIG. 1.
FIG. 3 is a detailed view of a preferred form of an individual particle forming the subject of this invention.

The decorative coating material of this invention is comprised of many small relatively uniformly sized particles preferably formed of a plastic compound made by mixing 30% of an acrylic resin together with 70% of polycarbonate resin to form the substance from which the particles of this invention are made. In this mixture the acrylic is dispersed in a random pattern of platelets distributed throughout the mass of the polycarbonate. A suitable dye may be introduced into the mixture and the mixed resin is extruded and formed into uniform sized particles preferably like those shown in FIG. 3, that have a particularly shiny surface characteristic. The final particulate material of this composition has an opalescent property that transmits light through the individual bodies of the particles to be reflected from the surfaces of the acrylic platelets dispersed throughout each of the particles to produce a most pleasing iridescent effect.

When the particles are dispersed over the bottom surface of the aquarium either as a covering over the entire bottom or in an attractive pattern, a most pleasing effect is produced when light beams are passed through and partly reflected from the particles. The coating may be spread over the contoured sandy bottom layer of an aquarium to form a uniformly colored surface layer on the sand that has the iridescent properties described above, which iridescence is enhanced by the shiny surface properties of the prefered resin mixture or a pleasing effect can also be produced by decorating the bottom surface layer of the aquarium with a layer made exclusively of the plastic particles themselves.

The individual particles of the plastic may be spherical, cylindrical, star shaped or may be made of any design. The individual pieces of any supply used to cover the bottom of an aquarium or used to produce an artistic pattern on the bottom, are all preferably of the same shape and are selected to be of about the same size to present a uniform covering when spread throughout the bowl.

The plastic material from which the particles are made may be produced in a variety of different colors but preferably any coverings laid down with these beads is composed of particles that are all of the same color. It is possible that mixed colors might be found to be desirable however, and a mix of different shapes and colors could be found attractive. In this last mentioned form of the invention, different colored particles might be grouped in a pattern to form a more attractive artistic display.

The prefered plastic particles are made from the polycarbonate and acrylic resin mix described above. The proportions of the mix may be varied somewhat but care should be taken to insure that the final mixture has the desired luminescent property when exposed to a source of light and the material selected preferably should have a finished shiny surface property. The mixture selected should preferably be one that can be extruded and should be one that can be satisfactorily colored with a conventional dye. The extruded plastic is prefered because of the particular shiny surface that results, which enhances the opalescent effect observed when the particles are spread over the bottom surface of the aquarium. This visual effect is most attractive when various lighting effects are played over the particles covering the bottom or the artistic display laid on the sand or other bottom.

Any water insoluble plastic that has a specific gravity greater than that of water can be used for this invention, but a mixture of a clear polycarbonate having a refractive index of 1.58 and an acrylic that has a refractive index of 1.49 has been found to be particularly useful for the making of the plastic particles of this invention which have the very attractive luminescence that adapts this material for the unique purpose of forming an attractive bottom display in an aquarium. The clear polycarbonate can be colored in the known manner with conventional dyes and is a plastic that can be easily extruded in a rod form in any desired shape. The individual rods can be cut into smaller sizes to form particles useful for this invention.

While the above describes the prefered form of this invention, it is possible that modifications thereof may occur to those skilled in the art that will fall within the scope of the following claims.

I claim:

1. An improved aquarium comprising a suitable tank having a bottom and transparent side walls for the transmission of light waves through the aquarium which is adapted to be filled with water, a granular coating material for use in decorating at least a portion of the bottom surface of the aquarium that is provided for the display of live fish or the like, said coating being formed of a plurality of substantially uniformly sized small insoluble solid particles of an extruded plastic compound, each of said particles having a shiny surface characteristic and having a body with an opalescent property that reflects an iridescent light from the individual particles, said compound being formed of a resin mixture that includes about 30% of acrylic platelets with about 70% of a polycarbonate, said acrylic being dispersed in a random pattern of platelets throughout the mass of the polycarbonate resin whereby said platelets of the acrylic component of said individual particles cooperate with the polycarbonate phase of the body of the particles to reflect ripples of light waves that result from the motion of the fish or other specimen on display in the aquarium as they move through the water to produce an interesting ever changing iridescent light display which enhances the interest in the overall display set up in the aquarium.

2. An aquarium as in claim 1 wherein said resin mixture includes a dye.

3. An aquarium as in claim 1 wherein the entire bottom of the aquarium is covered with said particles.

4. An aquarium as in claim 1 wherein batches of said particles may be dyed with different colors to be placed on the bottom of the aquarium to produce an interesting and variously colored pattern on the bottom of the aquarium.

* * * * *